C. E. PHOENIX.
SURVEYOR'S COMPASS.
APPLICATION FILED MAR. 30, 1921.

1,399,994. Patented Dec. 13, 1921.
2 SHEETS—SHEET 1.

INVENTOR,
Charles E. Phoenix.
BY David E. Lain,
ATTORNEY.

C. E. PHOENIX.
SURVEYOR'S COMPASS.
APPLICATION FILED MAR. 30, 1921.
1,399,994.
Patented Dec. 13, 1921.
2 SHEETS—SHEET 2.
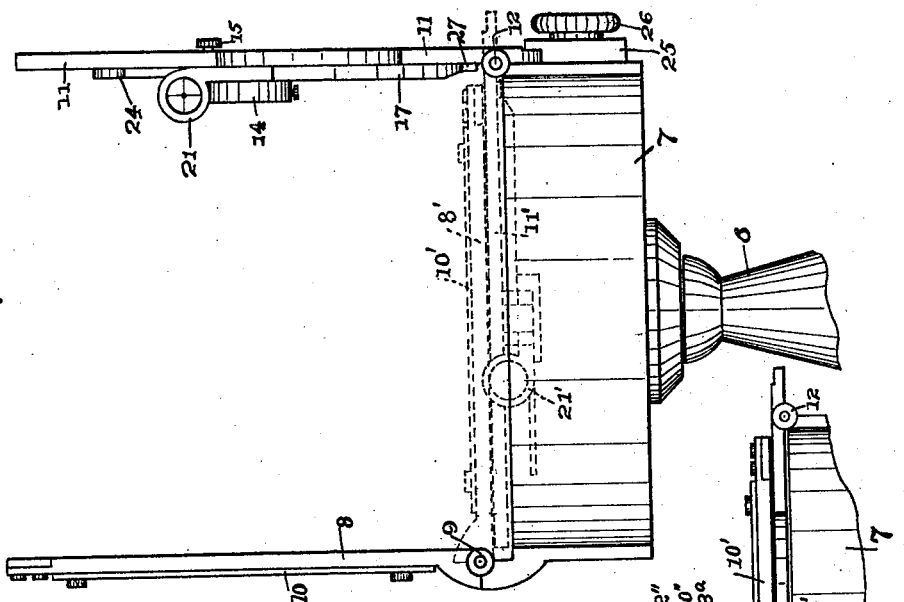
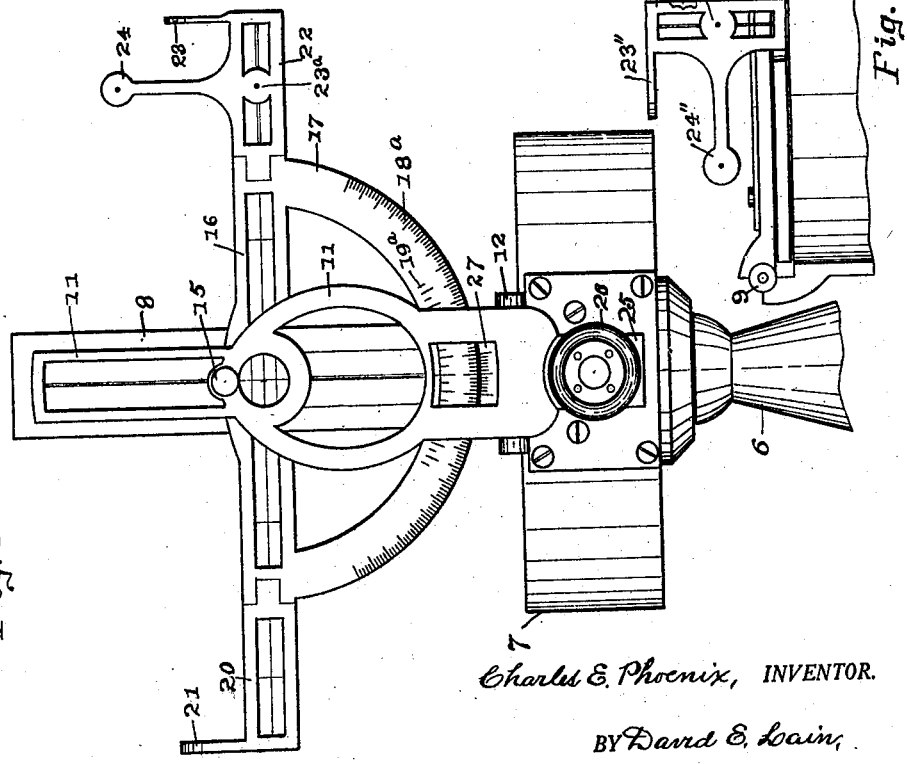
Charles E. Phoenix, INVENTOR.
BY David E. Lain,
ATTORNEY.

UNITED STATES PATENT OFFICE.

CHARLES E. PHOENIX, OF BELLINGHAM, WASHINGTON.

SURVEYOR'S COMPASS.

1,399,994.  Specification of Letters Patent.  Patented Dec. 13, 1921.

Application filed March 30, 1921. Serial No. 456,991.

*To all whom it may concern:*

Be it known that I, CHARLES E. PHOENIX, a citizen of the United States, and resident of Bellingham, in the county of Whatcom and State of Washington, have invented a new and useful Surveyor's Compass, of which the following is a specification.

My invention relates to improvements in surveyor's compasses, more especially those used for reconnaissance and for tracing mineral leads; and the objects of my invention are: 1st, to provide an instrument combining the character of an open-sight compass with that of a clinometer, adapted for determining contours and topography of location work; 2nd, to provide an instrument adapted for rapid work when running curves for roads where great accuracy is not required; and 3rd, to provide an instrument adapted for determining angles of underground works during examination of mine development, and also an instrument affording certain conveniences of use and compactness for stowing which will more fully appear as the description proceeds.

Figure 1:
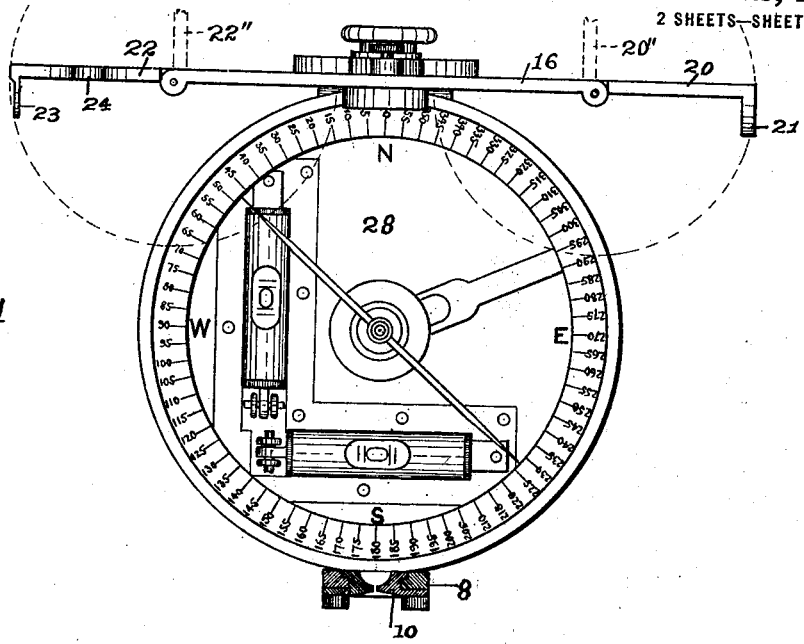
Figure 2:
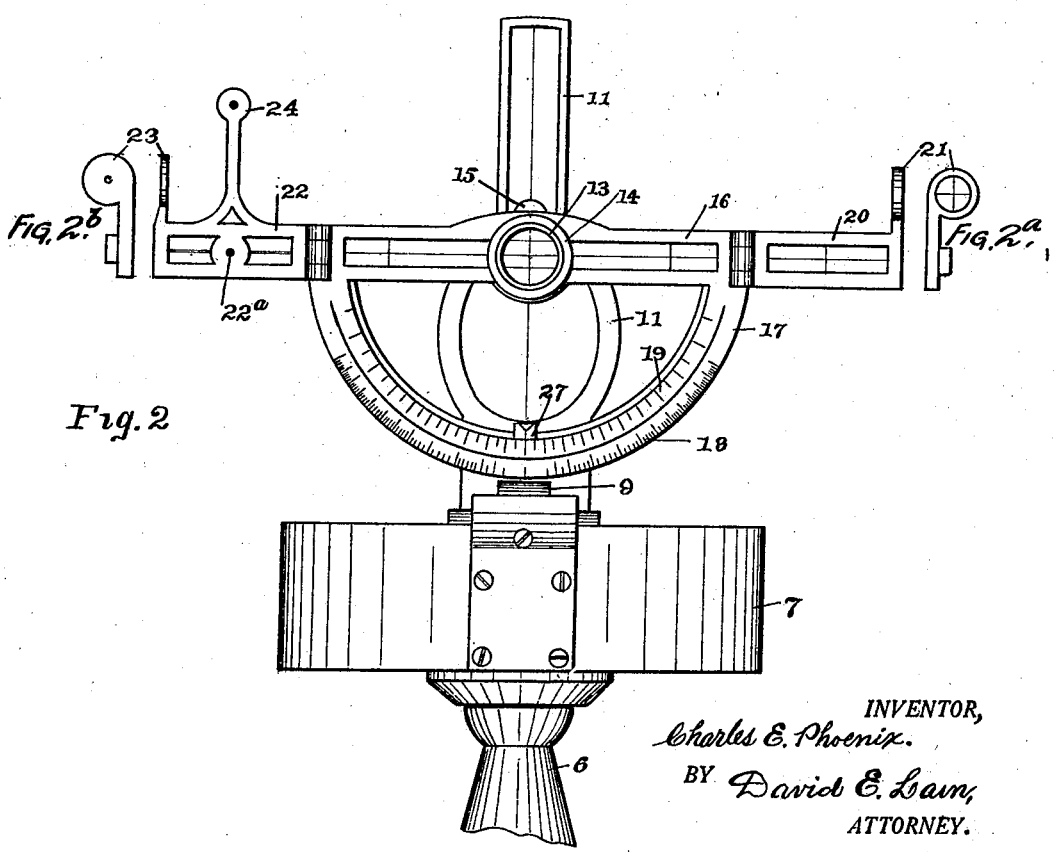

I attain these objects with the mechanism illustrated in the two sheets of accompanying drawings in which Figure 1 is a plan view of my instrument with the front sight broken away, Fig. 2 is a front elevation with the front sight removed at its hinge, Fig. $2^a$ is an end elevation of open sight 21, Fig. $2^b$ is an end elevation of peep sight 23, Fig. 3 is a rear elevation of the instrument, Fig. 4 is a side elevation, and Fig. 5 is a similar view to Fig. 4 with the front and back sights folded as for stowing except that the hinged extensions of the transverse sight arm are erected for reading horizontal angles.

Similar characters refer to similar parts throughout.

More particularly: 6 is the part of the instrument stand above the ball and socket joint and is connected to the instrument with a stud screw.

7 is the compass case.

8 is the front sight connected to the compass case with a horizontal hinge at $9^a$.

10 is a slide operable in a longitudinal slideway in front sight 8 for an upward extension thereof.

11 is the rear sight connected to the compass case by a horizontal hinge joint at 12.

13 is an annular boss on rear sight 11 adapted to mount a transverse sight arm for revolution. A hole pierces said rear sight registering with the interior of said ring boss.

14 is a set ring on said boss adapted to retain said transverse sight arm in operative position on said boss.

15 is a set screw adapted to fix said transverse sight arm on said mounting.

16 is said transverse sight arm mounted for revolution on annular boss 13.

17 is a graduated, semicircular arc fixed pendant to transverse sight arm 16.

18 is a cosine scale on the front side of arc 17, by preference reading by $\frac{1}{2}$ foot distances from 100 to 90 feet, then from 90 by one foot distances to 50 feet.

19 is a sine scale on arc 17, by preference, graduated in 5 foot elevations to 95 feet.

$18^a$ is a scale of degrees on the rear side of arc 17 reading by vernier 27 to 10 minutes.

$19^a$ is a scale of tangents on the rear side of arc 17 by preference graduated to 5 foot elevations.

20 is a hinged extension of one end of arm 16.

21 is an open sight erected on the end of extension 20.

22 is a hinged extension of the other end of arm 16.

23 is a peep sight erected on the end of 22 in line with sight 21 when said hinged extensions are in the plane of arm 16.

24 is a sight on extension 22 adapted for reading + or − on horizontal or vertical angles greater than the graduations on arc 10.

25 is a locking block clampable by thumb screw 26 adapted to clamp arc 19 in any desired position.

27 is a vernier used in connection with scales on arc 17.

28 is the instrument compass.

When sight $23^a$ on extension 22 is used with the cross hairs on extension 20 to read horizontal angles said extensions 20 and 22 are first set in their dotted positions at 20″ and 22″ in Fig. 1 and sights 11 and 8 are bent over into their stowed position at 11′ and 8′ in Fig. 4 when they appear as shown in full lines in Fig. 5.

But when it is desired to stow said extensions as shown in dotted lines in Fig. 4 they are first bent over on their hinges to lie against the front side of arm 16. When said sights 8 and 11 with their several attachments are stowed as shown in dotted lines in Fig. 4 the more delicate parts of the same are within case 7 and their upper surface presents a surface with few protuberances well adapted for the rough handling to which such instruments must on occasion be subjected during transportation.

Having thus fully disclosed my invention, what I claim as new and desire to secure by Letters Patent is,—

1. In a surveyor's compass in combination, a compass case; a compass mounted in said case; a front sight standard fastened to said case; a rear sight standard fastened to said case; a transverse sight arm pivotally mounted for rotation on said rear standard; a graduated arc fastened to said arm; and verniers on said rear standard readable with the scales on said arc.

2. In a surveyor's compass in combination, a compass case; a compass mounted in said case; a front sight standard hingedly connected to said case; a rear sight standard hingedly connected to said case; a transverse sight arm pivotally mounted for rotation on said rear standard, a sight extension hingedly joined to each end of said arm, each revoluble on its hinge from a position at right angles to the rear of said arm to a front position alongside of said arm; a graduated arc fastened to said arm; and verniers on said rear standard readable with the graduations on said arc.

3. In a surveyor's compass in combination, a compass case; a compass mounted in said case; a front sight standard hingedly connected to said case; a rear sight standard hingedly connected to said case; a transverse sight arm pivotally mounted for rotation on said rear standard; a sight extension hingedly joined to each end of said arm, each revoluble on its hinge from a position at right angles to the rear of said arm to a position along the front side of said arm, adapted when in said right-angle position, together with said other extension, and said standards folded over on said hinges to lie within and on top of said case, to read horizontal or vertical angles; a graduated arc fastened to said arm; and verniers on said rear standard readable with the graduations on said arc.

CHARLES E. PHOENIX.